US012522564B2

(12) United States Patent
Bertrand et al.

(10) Patent No.: US 12,522,564 B2
(45) Date of Patent: Jan. 13, 2026

(54) POLYMORPHS OF ELAFIBRANOR

(71) Applicant: GENFIT, Loos (FR)

(72) Inventors: Karine Bertrand, Bailleul (FR); Jean-François Delhomel, Arras (FR); Alice Roudot, Lomme (FR)

(73) Assignee: GENFIT, Loos (FR)

( * ) Notice: Subject to any disclaimer, the term of this patent is extended or adjusted under 35 U.S.C. 154(b) by 670 days.

(21) Appl. No.: 17/798,484

(22) PCT Filed: Feb. 4, 2021

(86) PCT No.: PCT/EP2021/052713

§ 371 (c)(1), (2) Date: Aug. 9, 2022

(87) PCT Pub. No.: WO2021/160520

PCT Pub. Date: Aug. 19, 2021

(65) Prior Publication Data

US 2023/0094109 A1 Mar. 30, 2023

(51) Int. Cl.
*C07C 323/62* (2006.01)
*A61P 1/16* (2006.01)

(52) U.S. Cl.
CPC .............. *C07C 323/62* (2013.01); *A61P 1/16* (2018.01); *C07B 2200/13* (2013.01)

(58) Field of Classification Search
CPC .......................... C07C 323/62; C07B 2200/13
See application file for complete search history.

(56) References Cited

U.S. PATENT DOCUMENTS

2021/0363101 A1 11/2021 Chen et al.

FOREIGN PATENT DOCUMENTS

| | | |
|---|---|---|
| WO | 2004/005233 | 1/2004 |
| WO | 2018/133705 | 7/2018 |
| WO | 2019/099761 | 5/2019 |

OTHER PUBLICATIONS

Byrn et al., "Pharmaceutical solids—A strategic approach to regulatory considerations", Pharmaceutical Research, Jul. 1995, vol. 12, pp. 945-954, [ISSN: 0724-8741].

Caira, "Crystalline Polymorphism of Organic Compounds", Topics in Current Chemistry, Jan. 1998, vol. 198, pp. 163-208, [ISSN: 0340-1022].

International Search Report for PCT/EP2021/052713, dated Jul. 7, 2022 (4 pages).

Written Opinion of the ISA for PCT/EP2021/052713, dated Jul. 7, 2022 (8 pages).

Szokol, Z. et al., "Crystalline Form of Elafibranor" Feb. 13, 2018, IP.com No. IPCOM000252802D (12 pages).

*Primary Examiner* — Susanna Moore

(74) *Attorney, Agent, or Firm* — NIXON & VANDERHYE, PC

(57) ABSTRACT

The present invention relates to novel crystalline forms of elafibranor.

22 Claims, 7 Drawing Sheets

POLYMORPHS OF ELAFIBRANOR

This application is the U.S. national phase of International Application No. PCT/EP2021/052713 filed Feb. 4, 2021 which designated the U.S. and claims priority to International Application No. PCT/EP2020/053359 filed Feb. 10, 2020, the entire contents of each of which are hereby incorporated by reference.

TECHNICAL FIELD

The present invention relates to new polymorphs of elafibranor, to pharmaceutical composition containing the same, and to methods for producing said polymorphs.

BACKGROUND 2-(2,6-dimethyl-4-{3-[4-(methylsulfanyl)phenyl]-3-oxo-propen-1-yl}phenoxy)-2-methylpropanoic acid (Elafibranor, or ELA, formerly named GFT505), a PPAR-alpha/delta dual agonist disclosed in WO2004005233, possesses properties that are advantageous for the treatment of a number of diseases, including fibrotic disorders, gastroenterology diseases and liver diseases, in particular cholestatic diseases such as primary biliary cholangitic (PBC) and PSC (primary sclerosing cholangitis), or liver diseases, in particular non-alcoholic fatty liver diseases (NAFLD) such as non-alcoholic steatohepatitis (NASH). Elafibranor was evaluated for clinical efficacy in NASH in a one-year liver biopsy-based Phase 2b trial (GFT505-2127), one of the largest interventional studies ever conducted in NASH. Administered to over 800 patients and healthy volunteers to date, elafibranor has demonstrated beneficial properties for NASH, including in particular: improvement of markers of liver dysfunction, including ALAT, ASAT, γGT, ALP; improvement of insulin sensitivity and glucose homeostasis; favorable effects on plasma lipids, including decrease of plasma triglycerides and LDL-C, and increase of HDL-C levels; anti-inflammatory properties; efficacy on histological NASH parameters (steatosis, inflammation, fibrosis) in animal disease models—anti-fibrotic activities; and the absence of safety concern has been confirmed in a full toxicological package up to 2-year carcinogenicity studies. Elafibranor is currently being evaluated in a clinical phase 3 study for the treatment of NASH. Evaluation of this molecule for the treatment of PBC in a clinical phase 2 study has also started.

Polymorphism occurs where the same composition of matter crystallizes in a different lattice arrangement, resulting in different thermodynamic properties and stabilities specific to the particular polymorphic form. When the chemical entity is a drug, the ability of the chemical entity to exist in more than one crystal can have a profound effect on the shelf life, solubility, formulation properties, and/or processing properties of the drug. It is thus very important to be able to ensure, from a quality standpoint, that the manufacturing process leads to the specific polymorphic form whose marketing is allowed by regulatory agencies and that formation of other polymorphic forms, with different thermodynamic properties and stabilities, are controlled.

Szokol (2018) (IP.com number IPCOM000252802D), has described a crystalline form of elafibranor. However, this form does not appear to be optimal and there is still a need to provide improved polymorphic forms of elafibranor.

SUMMARY OF INVENTION

The present invention provides crystalline forms of elafibranor that can provide improved physicochemical properties.

Five crystalline forms of elafibranor, referred to as form A, form B, form C, form D and form E), were identified. Among these forms, Form A corresponds to the crystal previously identified by Szokol. The present application thus provides new form B, form C, form D and form E of elafibranor.

DETAILED DESCRIPTION OF THE INVENTION

Definitions

Figure 1:
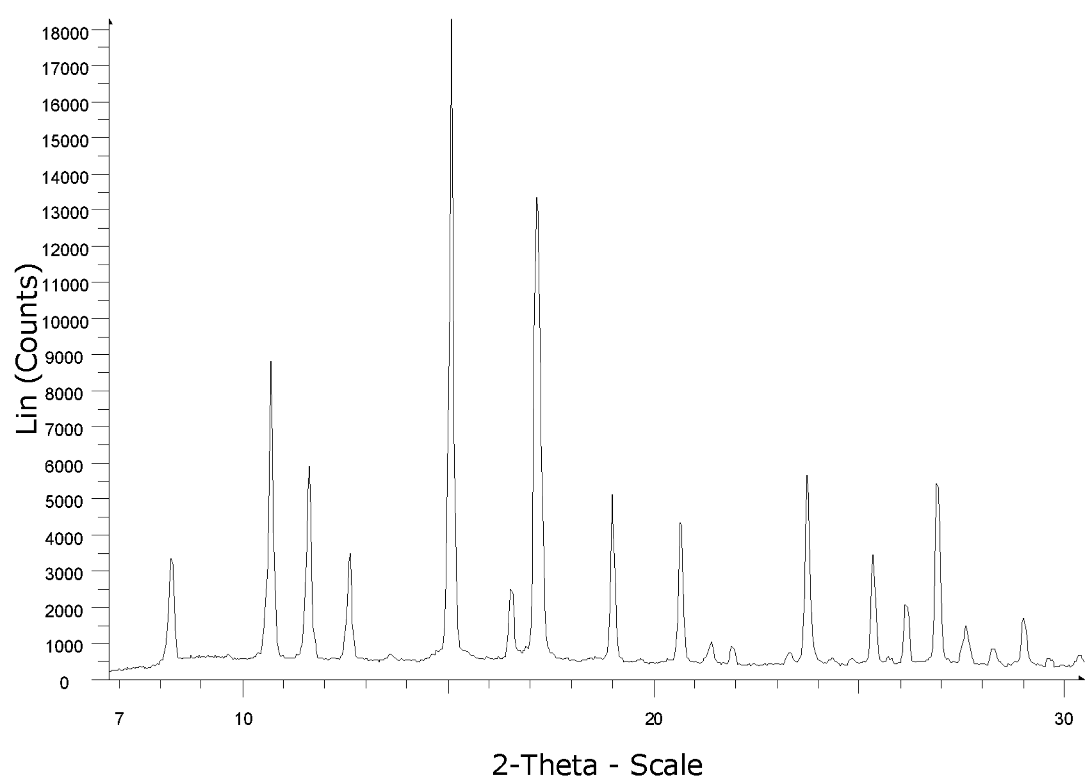
FIG. 1 shows X-ray diffraction profile of form A.

Unless defined otherwise, all technical and scientific terms used herein have the same meaning as is commonly understood by one of skill in the art to which the present disclosure belongs.

In the present disclosure, the singular forms "a", "an" and "the" include the plural reference, and reference to a particular numerical value includes at least that particular value, unless the context clearly indicates otherwise. Thus, for example, a reference to "a solvent" is a reference to one or more of such solvents and equivalents thereof to those skilled in the art, and so forth.

The term "about" or "approximately", when referring to a numerical value, denotes said value±10%, in particular said value±5%.

As used herein, the term "disease" refers to a disease, disorder, condition, symptom, or indication. This term is used interchangeably with the phrase "disease or disorder".

As used herein, the terms "treatment" or "therapy" (as well as different word forms thereof) include preventive (e.g., prophylactic), curative, or palliative treatment. Such preventive, curative, or palliative treatment may be full or partial. For example, complete elimination of unwanted symptoms of a disease, or partial elimination of one or more unwanted symptoms of a disease would represent "treatment" as contemplated herein.

As employed throughout the disclosure the term "effective amount" refers to an amount effective, at dosages, and for periods of time necessary, to achieve the desired result with respect to the treatment of the relevant disorder, condition, or side effect. It will be appreciated that the effective amount of components of the present invention will vary from patient to patient not only with the particular compound, component or composition selected, the route of administration, and the ability of the component to elicit a desired response in the individual, but also with factors such as the disease state or severity of the condition to be alleviated, hormone levels, age, sex, weight of the individual, the state of being of the patient, and the severity of the condition being treated, concurrent medication or special diets then being followed by the particular patient, and other factors which those skilled in the art will recognize, with the appropriate dosage ultimately being at the discretion of the attendant physician. Dosage regimens may be adjusted to provide the improved therapeutic response. An effective amount is also one in which any toxic or detrimental effects of the components are outweighed by the therapeutically beneficial effects. As an example, the compounds useful in the present invention are administered at a dosage and for a time such that the level of fibrosis or the activity of NASH as determined, for example, by evaluation of a NAS score, is reduced as compared to the level of fibrosis or NASH activity before the start of treatment.

"Pharmaceutically acceptable" refers to those compounds, materials, compositions, and/or dosage forms which are, within the scope of sound medical judgment, suitable for contact with the tissues of human beings and animals without excessive toxicity, irritation, allergic response, or other problem complications commensurate with a reasonable benefit/risk ratio.

Crystalline Forms of Elafibranor

Provided herein are new crystalline forms of elafibranor. Although elafibranor was known in the art in its amorphous form and in one crystalline form (hereinafter identified as "form A"), the present disclosure provides different other crystalline forms of this molecule. Crystalline forms of elafibranor may have advantageous properties including chemical purity, flowability, solubility, morphology or crystal habit, and stability (such as storage stability, stability to dehydration, stability to light, stability to polymorphic conversion, low hygroscopicity, and low content of residual solvents) that render them more appropriate for use in pharmaceutical compositions.

"Crystalline elafibranor" refers to polymorphic or pseudopolymorphic forms of elafibranor (i.e. hydrates or solvates).

In a particular embodiment, the crystalline form of elafibranor according to the invention is an anhydrous crystalline form.

The term "purity", when referring to one of the crystalline forms of elafibranor disclosed herein, means the degree to which the particular crystalline form is undiluted or unmixed with another crystalline form and/or extraneous material(s), and is expressed as a percentage by weight (wt %).

The term "purity", when referring to a formulation or dosage form of one of the crystalline forms of elafibranor disclosed herein, which formulation or dosage form comprises the particular crystalline form as the active pharmaceutical agent (as well as one or more other materials such as a pharmaceutically acceptable vehicle), means the degree to which the active pharmaceutical agent in the formulation or dosage form comprises that particular crystalline form and no other crystalline form(s) of elafibranor, and is also expressed as a percentage by weight (wt %).

Since the weight percent of a particular crystalline form can vary with measurements taken by different instruments, different calibrations and/or different software packages, those skilled in the art will appreciate that any measured purity level will show some variability. Due to these sources of variability, it is common to recite purity using the word "about" or "at least" when referring to the percent purity of a crystalline form.

Elafibranor has the structure represented in formula (I):

(I)

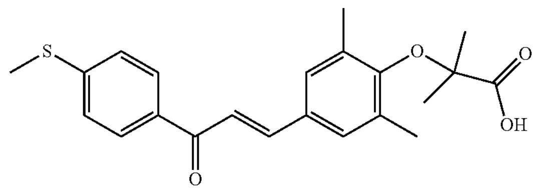

The existence of various crystallization polymorphic forms of elafibranor has been explored in order to determine suitable forms of the compound for use in pharmaceutical compositions. According to the invention, five different crystalline forms of elafibranor were identified.

According to the invention, a first crystalline form, identified as form A, has been prepared and corresponds to the crystal previously described by Szokol (2018) (IP.com number IPCOM000252802D). This Form A has a X-ray diffraction pattern comprising the following diffraction peaks (2θ in angular degrees ±0.2°): 8.3°, 10.7°, 11.6°, 15.1°, 20.7°, 26.9°, 27.6° and 29°.

Form A can be obtained according to the method provided in Szokol, 2018. Alternatively, crystal Form A can be prepared by crystallizing elafibranor from a solution thereof in a solvent such as DMF, or THF/water over 4 weeks at a temperature comprised between +4° C. and +8° C. away from light.

In another aspect, the invention relates to a crystal form B of elafibranor having a X-ray diffraction pattern comprising the following characteristic diffraction peaks (2θ, in angular degrees ±0.2°): 11.0°, 11.1°, 12.3°, 13.5°, 16.3°, 17.2° and 17.4°.

In a particular embodiment, the X-ray diffraction pattern of form B further comprises at least one of the following diffraction peaks (2θ in angular degrees ±0.2°): 7.9°, 15.7°, 15.9°, 16.6°, 22.8°, and 23.5°. In a particular embodiment, the X-ray diffraction pattern of form B comprises 1, 2, 3, 4, 5 or 6 of these peaks. In a particular embodiment, the X-ray diffraction pattern of form B comprises the following diffraction peaks (2θ in angular degrees ±0.2°): 7.9°, 11.0°, 11.1°, 12.3°, 13.5°, 15.7°, 15.9°, 16.3°, 16.6°, 17.2°, 17.4°, 22.8° and 23.5°.

In a further embodiment, the X-ray diffraction pattern of form B further comprises at least one of the following diffraction peaks (2θ in angular degrees ±0.2°): 12.6°, 19.0°, 20.0°, 20.3°, 23.8°, 24.4°, 25.2°, 25.4°, 26.3°, 26.7°, 27.2°, 27.8° and 28.3°. In a particular embodiment, the X-ray diffraction pattern of form B comprises 1, 2, 3, 4, 5, 6, 7, 8, 9, 10, 11, 12 or 13 of these peaks.

In yet another embodiment, the X-ray diffraction pattern of form B further comprises at least one of the following diffraction peaks (2θ in angular degrees ±0.2°): 7.9°, 11.0°, 11.1°, 12.3°, 12.6°, 13.5°, 15.7°, 15.9°, 16.3°, 16.6°, 17.2°, 17.4°, 19.0°, 20.0°, 20.3°, 22.8°, 23.5°, 23.8°, 24.4°, 25.2°, 25.4°, 26.3°, 26.7°, 27.2°, 27.8° and 28.3°.

Figure 2:
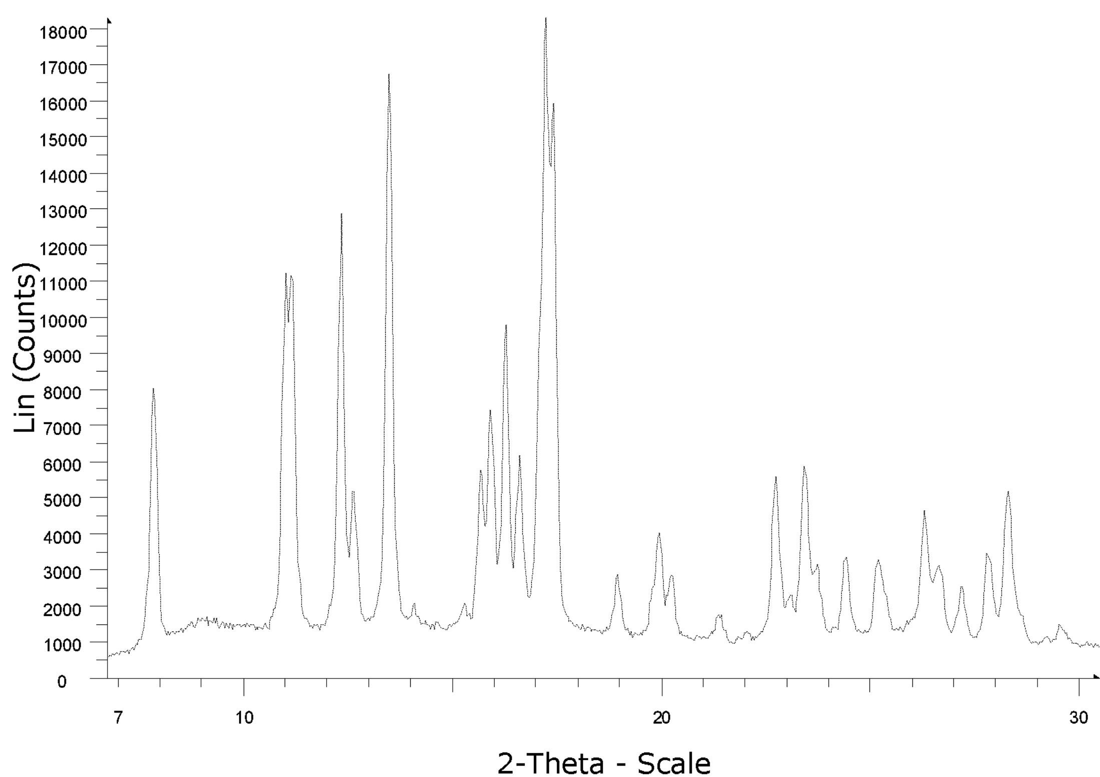
FIG. 2 shows X-ray diffraction profile of form B.

In a further particular embodiment, the X-ray diffraction pattern of form B is as shown in FIG. 2.

The preparation of form B, comprises the steps of providing a solution of elafibranor dissolved in isopropyl alcohol. After partial distillation of isopropyl alcohol (about half of the initial volume of solution), the reaction mixture was cooled at 0° C. and crystallized to afford purified Form B after filtration, washing with cold isopropyl alcohol and drying.

In another aspect, the invention relates to a crystal Form C of elafibranor, wherein form C is a 1:1 stoichiometric ethanol solvate of elafibranor. Form C has a X-ray diffraction pattern comprising the following characteristic diffraction peaks (2θ in angular degrees ±0.2°): 17.7°, 23.3°, 27.3°, 34.3°, and 34.6°.

In a particular embodiment of the invention, the X-ray diffraction pattern of form C further comprises the following diffraction peak (2θ in angular degrees ±0.2°): 28.9°. In particular embodiment, the X-ray diffraction pattern of form C comprises the following diffraction peaks (20 in angular degrees ±0.2°):17.7°, 23.3°, 27.3°, 28.9°, 34.3°, and 34.6°.

In a particular embodiment of the invention, the X-ray diffraction pattern of form C further comprises the following diffraction peaks (2θ in angular degrees ±0.2°): 8.9°, 10.1°, 10.7°, 11.3°, 32.0° and 35.5°. In a particular embodiment, the X-ray diffraction pattern of form C comprises 1, 2, 3, 4, 5 or 6 of these peaks.

In yet another embodiment, the X-ray diffraction pattern of form C comprises the following diffraction peaks (2θ in angular degrees ±0.2°): 8.9°, 10.1°, 10.7°, 11.3°, 17.7°, 23.3°, 27.3°, 28.9°, 32.0°, 34.30, 34.6° and 35.50.

Figure 3:
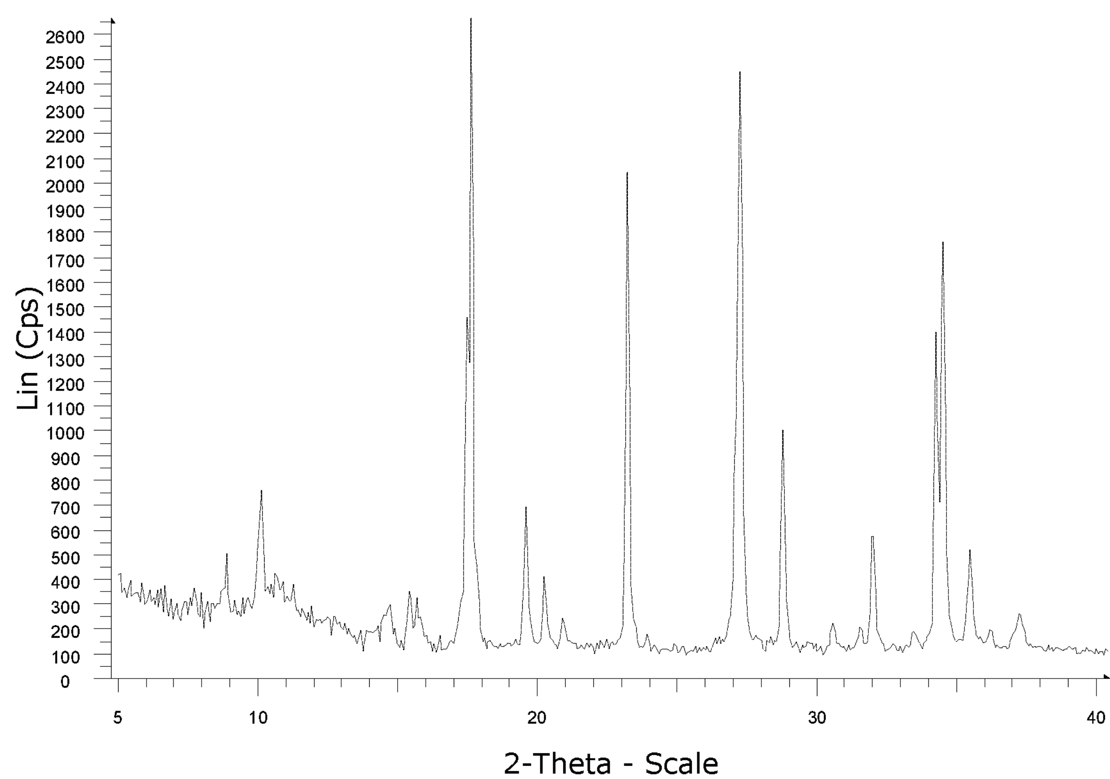
FIG. 3 shows X-ray diffraction profile of form C (recrystallized in EtOH).

In a further particular embodiment, the X-ray diffraction pattern of form C is as shown in FIG. 3.

Crystal form C can be prepared by crystallizing elafibranor in suspension from a solution thereof in ethanol over 4 weeks at a temperature comprised between +4° C. and +8° C. away from light.

In another aspect, the invention relates to a crystal Form D of elafibranor wherein Form D is a 1:1 stoichiometric methanol solvate of elafibranor. Form D has a X-ray diffraction pattern comprising the following characteristic diffraction peaks (2θ in angular degrees ±0.2°): 10.9°, 15.6°, 16.1°, 18.6°, 19.9° and 20.7°.

In a particular embodiment of the invention, the X-ray diffraction pattern of form D further comprises the following diffraction peaks (2θ in angular degrees ±0.2°): 7.8°, 17.7°, 18.1°, 21.9°, 22.3° and 24.6°. In a particular embodiment, the X-ray diffraction pattern of form D comprises 1, 2, 3, 4, 5 or 6 of these peaks. In particular embodiment, the X-ray diffraction pattern of form D comprises the following diffraction peaks (2θ in angular degrees ±0.2°): 7.8°, 10.9°, 15.6°, 16.1°, 17.7°, 18.1°, 18.6°, 19.9°, 20.7°, 21.9°, 22.3° and 24.6°.

In a particular embodiment of the invention, the X-ray diffraction pattern of form D further comprises the following diffraction peaks (2θ in angular degrees ±0.2°): 9.3°, 12.9°, 13.4°, 14.7°, 24.1°, 25.1°, 25.5°, 25.8°, 26.1°, 27.3°, 28.0°, 28.4°, 29.2°, 29.9°, 32.3°, 32.9° and 33.6°. In a particular embodiment, the X-ray diffraction pattern of form D comprises 1, 2, 3, 4, 5, 6, 7, 8, 9, 10, 11, 12, 13, 14, 15, 16 or 17 of these peaks.

In yet another embodiment, the X-ray diffraction pattern of form D comprises the following diffraction peaks (2θ in angular degrees ±0.2°): 7.8°, 9.3°, 10.9°, 12.9°, 13.4°, 14.7°, 15.6°, 16.1°, 17.7°, 18.1°, 18.6°, 19.9°, 20.7°, 21.9°, 22.3°, 24.1°, 24.6°, 25.1°, 25.5°, 25.8°, 26.1°, 27.3°, 28.0°, 28.4°, 29.2°, 29.9°, 32.3°, 32.9° and 33.6°.

Figure 4:
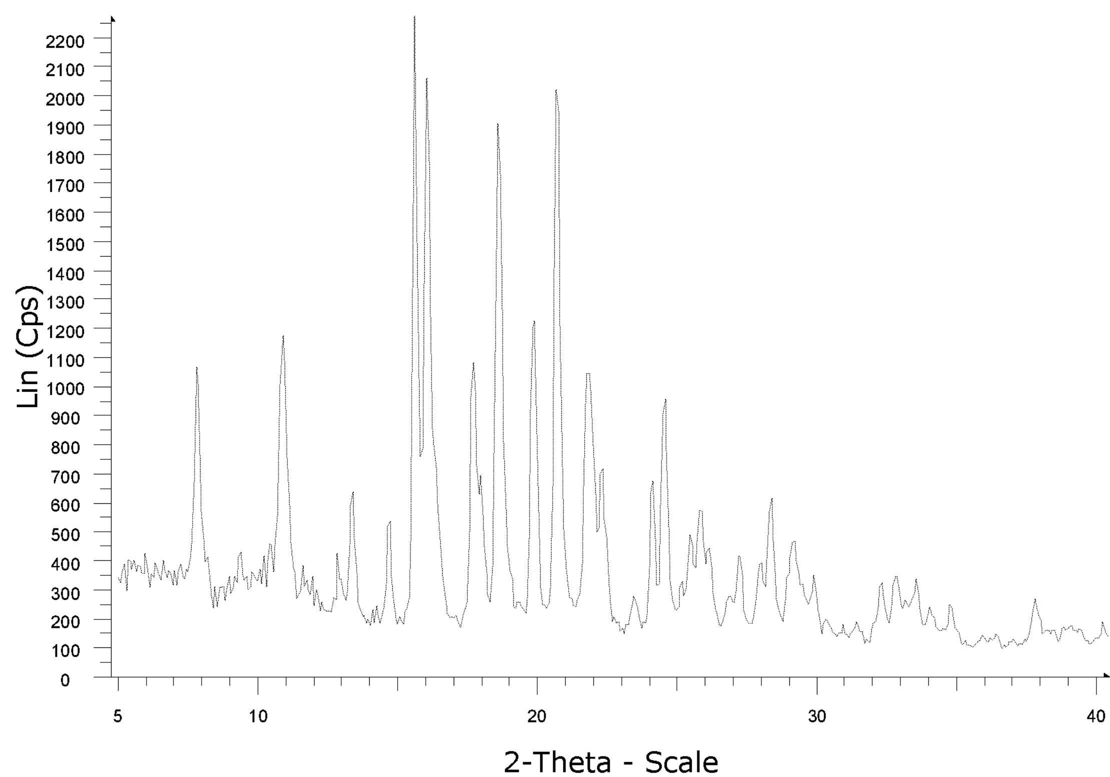
FIG. 4 shows X-ray diffraction profile of form D (recrystallized in MeOH).

In a further particular embodiment, the X-ray diffraction pattern of form D is as shown in FIG. 4.

Crystal form D can be prepared by crystallizing elafibranor in suspension from a solution thereof in methanol over 4 weeks at a temperature comprised between +4° C. and +8° C. away from light.

In another aspect, the invention relates to a crystal form E of elafibranor, wherein form E is a 1:1 stoichiometric N,N-dimethylacetamide solvate of elafibranor. Form E has a X-ray diffraction pattern comprising the following characteristic diffraction peaks (2θ in angular degrees ±0.2°): 13.3°, 15.1°, 17.1° and 29.5°.

In a particular embodiment of the invention, the X-ray diffraction pattern of form E further comprises the following diffraction peaks (2θ in angular degrees ±0.2°): 18.1°, 25.2°, 25.9° and 26.2°. In a particular embodiment, the X-ray diffraction pattern of form E comprises 1, 2, 3 or 4 of these peaks. In particular embodiment, the X-ray diffraction pattern of form E comprises the following diffraction peaks (2θ in angular degrees ±0.2°): 13.3°, 15.1°, 17.1°, 18.1°, 25.2°, 25.9°, 26.2° and 29.5°.

In a particular embodiment of the invention, the X-ray diffraction pattern of form E further comprises the following diffraction peaks (2θ in angular degrees ±0.2°): 7.6°, 8.6°, 11.2°, 16.1°, 16.9°, 17.8° and 22.8°. In a particular embodiment, the X-ray diffraction pattern of form E comprises 1, 2, 3, 4, 5, 6 or 7 of these peaks.

In yet another embodiment, the X-ray diffraction pattern of form E comprises the following diffraction peaks (2θ in angular degrees ±0.2°): 7.6°, 8.6°, 11.2°, 13.3°, 15.1°, 17.1°, 16.1°, 16.9°, 17.8°, 18.1°, 22.8°, 25.2°, 25.9°, 26.2° and 29.5°.

Figure 5:
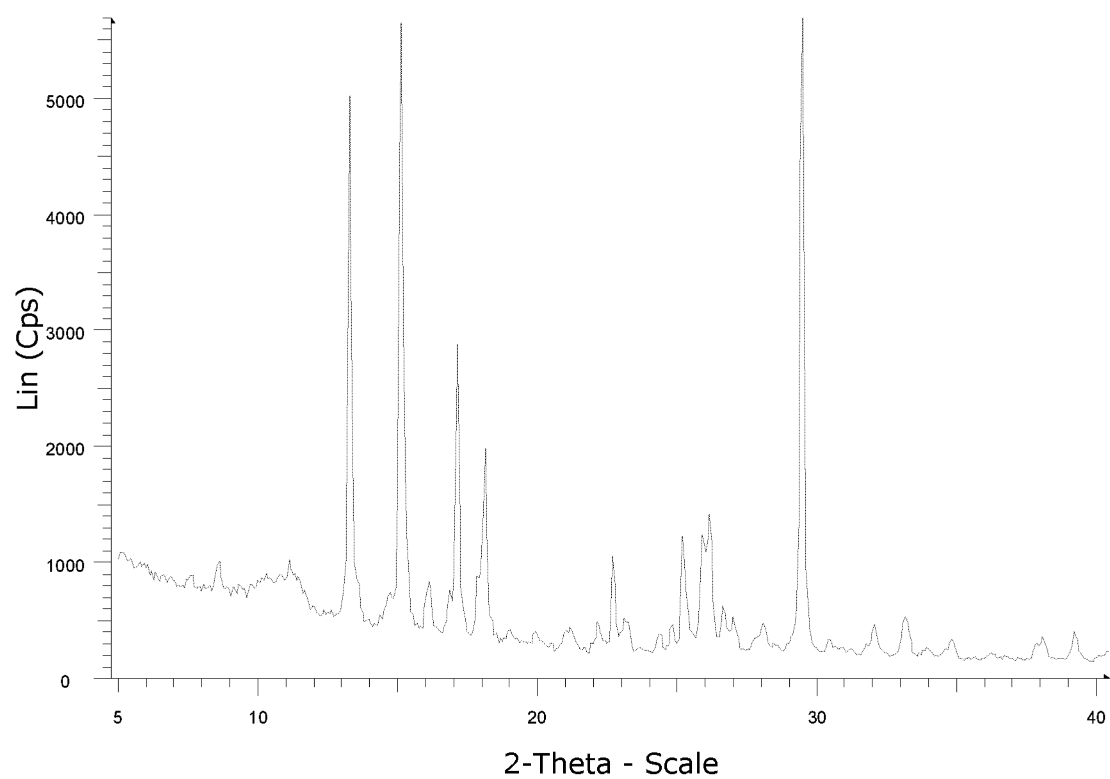
FIG. 5 shows X-ray diffraction profile of form E (recrystallized in DMA).
Figure 6:
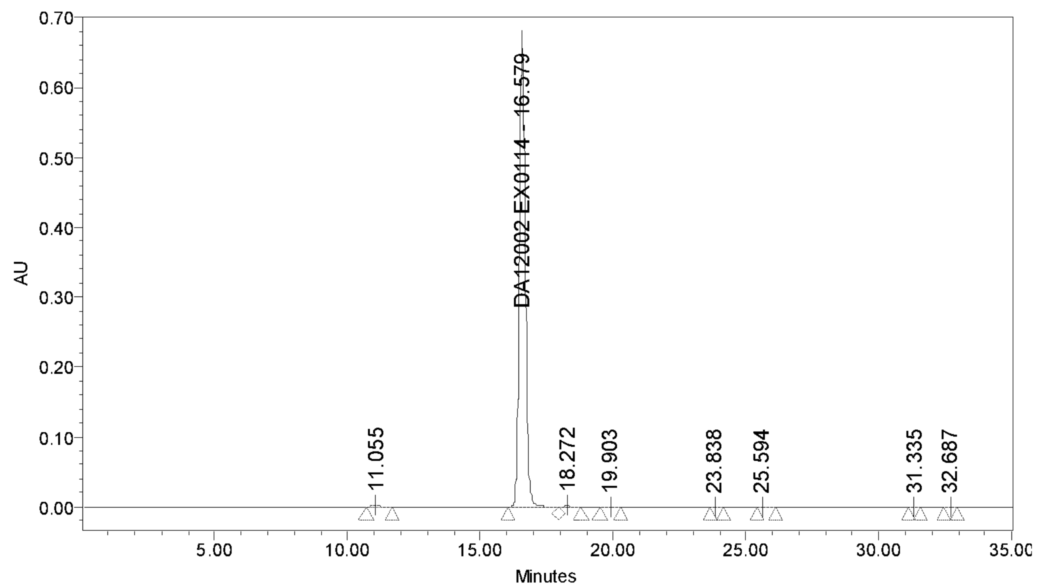
FIG. 6 shows the HPLC profile of form B at 350 nm.
Figure 7:
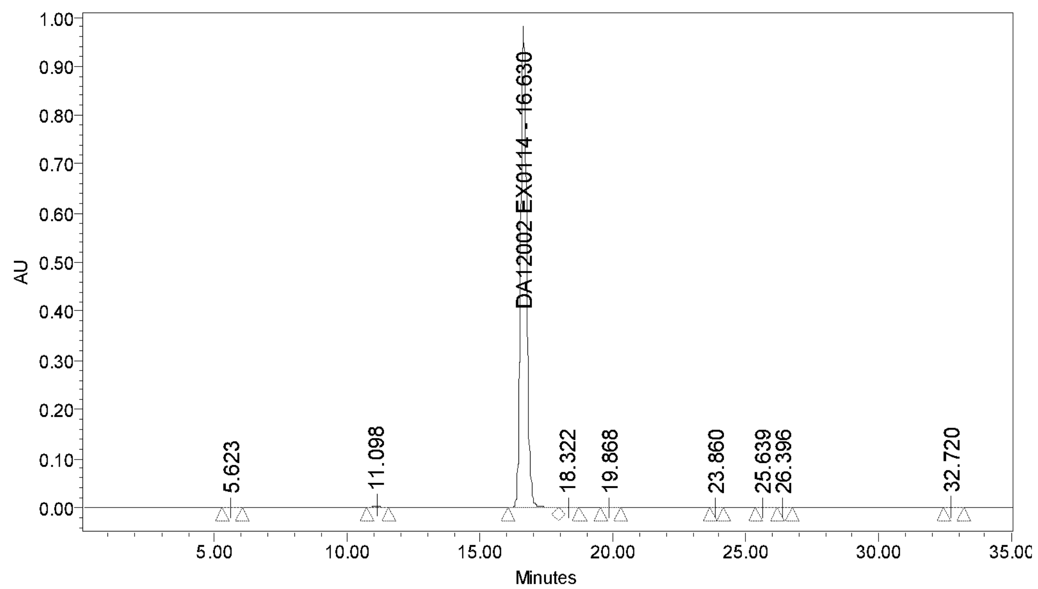
FIG. 7 shows the HPLC profile of form C (recrystallized in EtOH) at 350 nm.
Figure 8:
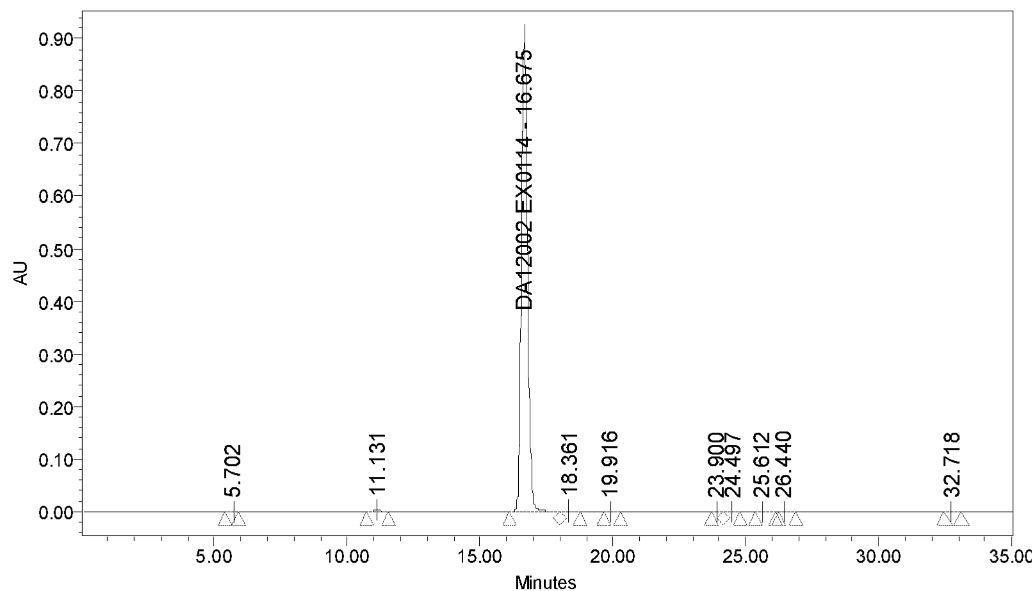
FIG. 8 shows the HPLC profile of form D (recrystallized in MeOH) at 350 nm.
Figure 9:
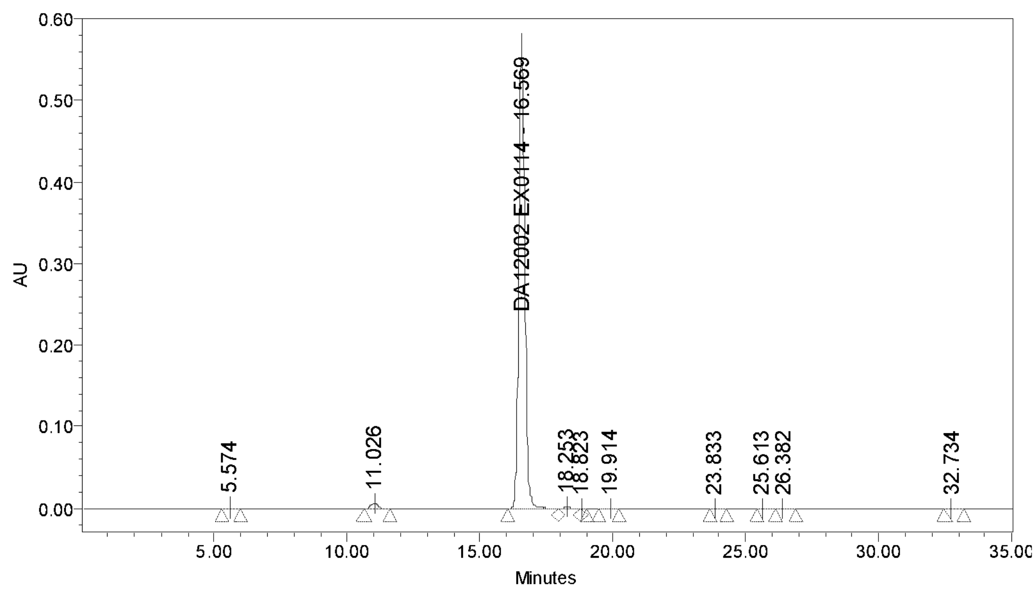
FIG. 9 shows the HPLC profile of form E (recrystallized in DMA) at 350 nm.

In a further particular embodiment, the X-ray diffraction pattern of form E is as shown in FIG. 5.

Crystal form E can be recrystallized by spontaneous evaporation of a solution of elafibranor in N,N-dimethylacetamide at room temperature and atmosphere away from light.

Single-crystal X-ray diffraction provides three-dimensional structural information about the positions of atoms and bonds in a crystalline form. It is not always possible or feasible, however, to obtain such a structure from a crystalline form due to, for example, insufficient crystal size or difficulty in preparing crystals of sufficient quality for single-crystal X-ray diffraction. Structural identification information can, however, be obtained from other solid-state techniques such as X-ray powder diffraction and Raman spectroscopy. These techniques are used to generate data on a solid crystalline form. Once that data has been collected on a known crystalline form, that data can be used to identify the presence of that crystalline form in other materials. Thus, these data effectively characterize the crystalline form. For example, a X-ray powder diffraction pattern, or a portion thereof, can serve as a fingerprint which characterizes a crystalline form. A X-ray powder diffraction plot is an x-y graph with scattering angles 2θ (diffraction) on the x-axis and intensity on the y-axis. The peaks within this plot can be used to characterize a crystalline form. Although the peaks within an entire diffractogram can be used to characterize a crystalline form, a subset of the more characteristic peaks can also be used to accurately characterize a crystalline form. The data is often represented by the position of the peaks on the x-axis rather than the intensity of peaks on the y-axis because peak intensity may vary with sample orientation. There is also variability in the position of peaks on the x-axis. There are several sources of this variability, one of which comes from sample preparation.

Samples of the same crystalline material prepared under different conditions may yield slightly different diffractograms. Factors such as particle size, moisture content, solvent content, and orientation can affect how a sample diffracts X-rays. Another source of variability comes from instrument parameters. Different X-ray instruments operate using different parameters and these may lead to slightly different diffraction patterns from the same crystalline form. Likewise, different software packages process X-ray data differently and this also leads to variability. These and other sources of variability are known to those of ordinary skill in the art. Due to these sources of variability, it is common to recite X-ray diffraction peaks using the word "about" prior to the peak value in 2θ. The word "about" incorporates this variability which under most sampling conditions, and most data collection and data processing conditions, leads to a variability in peak position of about plus or minus 0.2 scattering angle (2θ). Thus, when a peak is said to be at about 10.5 scattering angle (2θ), under most sampling, data collection, and data processing conditions, that peak will appear anywhere between 10.3 (2θ) and 10.7 (2θ).

High-performance liquid chromatography, or HPLC, is a chromatographic technique used to separate the compounds in a mixture, to identify each compound, and to quantify each compound. HPLC is a technique known in the art to determine the purity of a compound.

The purity of Forms A, B, C, D and E of elafibranor can be determined using HPLC as is well known to those of ordinary skill in the art.

In a preferred embodiment of the invention, the crystal forms A, B, C, D and E are substantially free of impurities.

By "substantially free", it is meant in the present invention that crystal forms A, B, C, D and E comprise less than 10%, preferably less than 5% and more preferably less than 2% of any or impurity or impurities.

In certain embodiments, the substantial absence of impurities means the substantial absence of extraneous matter, such as a salt forming acid, residual solvents, or any other impurities that can result from the preparation, and/or isolation of compound of formula (I).

In a particular embodiment, the crystal form has a purity of at least 85%, in particular of at least 86%, 87%, 88%, 89%, 90%, 91%, 92%, 93%, 94%, 95%, 96%, 97%, 98% or even of at least 99%. According to another of its aspects, the present invention relates to pharmaceutical compositions comprising as active principle a crystal form of elafibranor according to the invention. These pharmaceutical compositions comprise an effective dose of at least one crystal form of elafibranor according to the invention and also at least one pharmaceutically acceptable excipient. The said excipients are selected, in accordance with the pharmaceutical form and method of administration desired, from the customary excipients, which are known to a person skilled in the art.

In one aspect the pharmaceutical composition of the present invention comprises as active principle a crystalline form of elafibranor selected from the group consisting of form A, form B, form C, form D and form E, in particular selected from the group consisting of form B, form C, form D and form E.

The compositions of the invention can be formulated for any type of administration. For example, the compositions can be formulated for oral, topical, parenteral or enteral administration, or for inhalation. The crystalline form of elafibranor can be formulated for neat administration, or in combination with conventional pharmaceutical carriers, diluents, or excipients, which can be liquid or solid. The applicable solid carrier, diluent, or excipient can function as, among other things, a binder, disintegrant, filler, lubricant, glidant, compression aid, processing aid, color, sweetener, preservative, suspensing/dispersing agent, tablet-disintegrating agent, encapsulating material, film former or coating, flavoring agent, or printing ink. Any material used in preparing any dosage unit form is preferably pharmaceutically pure and substantially non-toxic in the amounts employed.

In addition, the crystalline form of elafibranor can be incorporated into sustained-release preparations and formulations. Administration in this respect includes administration by, inter alia, the following routes: intravenous, intramuscular, subcutaneous, intraocular, intrasynovial, transepithelial including transdermal, ophthalmic, sublingual and buccal; topically including ophthalmic, dermal, ocular, rectal and nasal inhalation via insufflation, aerosol, and rectal systemic.

In powders, the carrier, diluent, or excipient can be a finely divided solid that is in admixture with the finely divided active ingredient. In tablets, the active ingredient is mixed with a carrier, diluent or excipient having the necessary compression properties in suitable proportions and compacted in the shape and size desired. For oral therapeutic administration, the active compound can be incorporated with the carrier, diluent, or excipient and used in the form of ingestible tablets, buccal tablets, troches, capsules, elixirs, suspensions, syrups, wafers, and the like. The amount of active compound(s) in such therapeutically useful compositions is preferably such that a suitable dosage will be obtained.

Liquid carriers, diluents, or excipients can be used in preparing solutions, suspensions, emulsions, syrups, elixirs, and the like. The active ingredient of this invention can be dissolved or suspended in a pharmaceutically acceptable liquid such as water, an organic solvent, a mixture of both, or pharmaceutically acceptable oils or fat. The liquid carrier, excipient, or diluent can contain other suitable pharmaceutical additives such as solubilizers, emulsifiers, buffers, preservatives, sweeteners, flavoring agents, suspending agents, thickening agents, colors, viscosity regulators, stabilizers, or osmo-regulators.

Suitable solid carriers, diluents, and excipients can include, for example, calcium phosphate, silicon dioxide, magnesium stearate, talc, sugars, lactose, dextrin, starch, gelatin, cellulose, methyl cellulose, ethylcellulose, sodium carboxymethyl cellulose, microcrystalline cellulose, polyvinylpyrrolidine, low melting waxes, ion exchange resins, croscarmellose carbon, acacia, pregelatinized starch, crospovidone, HPMC, povidone, titanium dioxide, polycrystalline cellulose, aluminum methahydroxide, agar-agar, tragacanth, or mixtures thereof.

Suitable examples of liquid carriers, diluents and excipients, for example, for oral, topical, or parenteral administration, include water (particularly containing additives as above, e.g. cellulose derivatives, preferably sodium carboxymethyl cellulose solution), alcohols (including monohydric alcohols and polyhydric alcohols, e.g. glycols) and their derivatives, and oils (e.g. fractionated coconut oil and arachis oil), or mixtures thereof.

For parenteral administration, the carrier, diluent, or excipient can also be an oily ester such as ethyl oleate and isopropyl myristate. Also contemplated are sterile liquid carriers, diluents, or excipients, which are used in sterile liquid form compositions for parenteral administration. Solutions of the active compounds as free bases or pharmacologically acceptable salts can be prepared in water suitably mixed with a surfactant, such as hydroxypropylcellulose. A dispersion can also be prepared in glycerol, liquid polyethylene glycols, and mixtures thereof and in oils. Under ordinary conditions of storage and use, these preparations can contain a preservative to prevent the growth of microorganisms.

The pharmaceutical forms suitable for injectable use include, for example, sterile aqueous solutions or dispersions and sterile powders for the extemporaneous preparation of sterile injectable solutions or dispersions. In all cases, the form is preferably sterile and fluid to provide easy syringability. It is preferably stable under the conditions of manufacture and storage and is preferably preserved against the contaminating action of microorganisms such as bacteria and fungi. The carrier, diluent, or excipient can be a solvent or dispersion medium containing, for example, water, ethanol, polyol (for example, glycerol, propylene glycol, liquid polyethylene glycol and the like), suitable mixtures thereof, and vegetable oils. The proper fluidity can be maintained, for example, by the use of a coating, such as lecithin, by the maintenance of the required particle size in the case of a dispersion, and by the use of surfactants. The prevention of the action of microorganisms can be achieved by various antibacterial and antifungal agents, for example, parabens, chlorobutanol, phenol, sorbic acid, thimerosal and the like. In many cases, it will be preferable to include isotonic agents, for example, sugars or sodium chloride. Prolonged absorption of the injectable compositions can be achieved by the use of agents delaying absorption, for example, aluminum monostearate and gelatin.

Sterile injectable solutions can be prepared by incorporating the crystalline form of elafibranor in the pharmaceutically appropriate amounts, in the appropriate solvent, with various of the other ingredients enumerated above, as required, followed by filtered sterilization. Generally, dispersions can be prepared by incorporating the sterilized active ingredient into a sterile vehicle which contains the basic dispersion medium and the required other ingredients from those enumerated above. In the case of sterile powders for the preparation of sterile injectable solutions, the preferred methods of preparation can include vacuum drying and freeze drying techniques that yield a powder of the active ingredient or ingredients, plus any additional desired ingredient from the previously sterile-filtered solution thereof.

Also disclosed are methods of producing such pharmaceutical compositions comprising combining any of the previously disclosed embodiments of the crystalline form of elafibranor with a pharmaceutically acceptable excipient. Any acceptable method of combining an active agent with a pharmaceutically acceptable excipient can be used in accordance with the present methods, and those of ordinary skill in the art can readily appreciate appropriate techniques of combination. In some embodiments, the step of combination can be as simple as adding a desired quantity of the crystalline form of elafibranor to an existing substance, such as a liquid beverage or a powdered beverage mixture. In other embodiments, the step of combination includes any technique that is conventionally used to mix active agents with excipients pursuant to preparing a pharmaceutical dosage form (for example, solid, semi-solid, liquid, or in a form suitable for inhalation), a cosmetic item (such as a powder, cream, lotion, or emollient), or a food item (for example, solid, semi-solid, or liquid).

In other aspects, the present disclosure provides a therapeutic method for the treatment of a disease in a subject in need thereof, comprising administering to said subject a therapeutically effective amount of a crystalline form of elafibranor as disclosed herein.

As used herein, the phrase "therapeutically effective amount" refers to the amount of active compound that elicits the biological or medicinal response that is being sought in a tissue, system, animal, individual or human by a researcher, veterinarian, medical doctor or other clinician, which includes one or more of the following:

(1) preventing the disease or condition; for example, preventing a disease, condition or disorder in an individual who may be predisposed to the disease, condition or disorder but does not yet experience or display the pathology or symptomatology of the disease;

(2) inhibiting the disease or condition; for example, inhibiting a disease, condition or disorder in an individual who is experiencing or displaying the pathology or symptomatology of the disease, condition or disorder (i.e., including arresting further development of the pathology and/or symptomatology); and (3) ameliorating the disease or condition; for example, ameliorating a disease, condition or disorder in an individual who is experiencing or displaying the pathology or symptomatology of the disease, condition or disorder (i.e., including reversing the pathology and/or symptomatology).

The administration of the crystalline form of elafibranor can be by any of the routes described above in connection with the present pharmaceutical compositions. For example, the crystalline form of elafibranor can be administered orally, topically, parenterally, enterally, or by inhalation. The crystalline form of elafibranor can be administered in combination with a pharmaceutically acceptable excipient.

The subject is a mammalian subject, preferably a human subject. However, the subject can also be any animal, including a laboratory animal. Thus, as can be readily appreciated by one of ordinary skill in the art, the methods, crystalline forms and compositions of the present invention are particularly suited to administration to any animal, particularly a mammal, and including, but by no means limited to, humans, domestic animals, such as feline or canine subjects, farm animals, such as but not limited to bovine, equine, caprine, ovine, and porcine subjects, wild animals (whether in the wild or in a zoological garden), research animals, such as mice, rats, rabbits, goats, sheep, pigs, dogs, cats, and the like, avian species, such as chickens, turkeys, songbirds, and the like, i.e., for veterinary medical use.

The crystalline form of the present invention can be used in methods for treating a number of diseases or conditions. In particular, the pharmaceutical composition of the present invention is administered to a subject in need thereof for the treatment of any disease or condition disclosed in WO 2004/005233, WO 2004/005243, WO 2011/064350 or WO 2014/111584.

In a particular embodiment, the disease to be treated is immune, inflammatory, metabolic, fibrotic and cholestatic diseases. In a particular embodiment, the disease is selected in the group consisting of metabolic liver diseases, non-alcoholic fatty liver disease (NAFLD), non-alcoholic steatohepatitis (NASH), drug-induced liver diseases, alcohol-induced liver diseases, infectious agent induced liver diseases, inflammatory liver diseases, immune system dysfunction-mediated liver diseases, dyslipidemia, cardiovascular diseases, restenosis, syndrome X, metabolic syndrome, diabetes, obesity, hypertension, chronic cholangiopathies such as Primary Sclerosing Cholangitis (PSC), Primary Biliary Cholangitis (PBC), biliary atresia, familial intrahepatic cholestasis type 3 (PFIC3), inflammatory bowel diseases, Crohn's disease, ulcerative colitis, keloid, old myocardial infarction, scleroderma/systemic sclerosis, inflammatory diseases, neurodegenerative diseases, cancers, liver cancer, hepatocallular carcinoma, gastrointestinal cancer, gastric cancer, meningioma associated with neurofibromatosis, pancreatic neuroendocrine tumors, pancreatic exocrine tumors, leukemia, myeloproliferative/myelodisplastic diseases, mastocytosis, dermatofibrosarcoma, solid tumors including breast, lung, thyroid or colorectal cancer, a prostate cancer, liver fibrosis or cirrhosis of any origin, metabolic disease-induced liver fibrosis or cirrhosis, NAFLD-induced fibrosis or cirrhosis, NASH-induced fibrosis or cirrhosis, alcohol-induced liver fibrosis or cirrhosis, drug-induced liver fibrosis or cirrhosis, infectious agent-induced liver fibrosis or cirrhosis, parasite infection-induced liver fibrosis or cirrhosis, bacterial infection-induced liver fibrosis or cirrhosis, viral infection-induced fibrosis or cirrhosis, HBV-infection induced liver fibrosis or cirrhosis, HCV-infection induced liver fibrosis or cirrhosis, HIV-infection induced liver fibrosis or cirrhosis, dual HCV and HIV-infection induced liver fibrosis or cirrhosis, radiation- or chemotherapy-induced fibrosis or cirrhosis, biliary tract fibrosis, liver fibrosis or cirrhosis due to any chronic cholestatic disease, gut fibrosis of any etiology, Crohn's disease-induced fibrosis, ulcerative colitis-induced fibrosis, intestine (e.g. small intestine) fibrosis, colon fibrosis, stomach fibrosis, skin fibrosis, epidermis fibrosis, endodermis fibrosis, skin fibrosis due to scleroderma/systemic sclerosis, lung fibrosis, lung fibrosis consecutive to chronic inflammatory airway diseases, such as COPD, asthma, emphysema, smoker's lung, tuberculosis, pulmonary fibrosis, idiopathic pulmonary fibrosis (IPF), heart fibrosis, kidney fibrosis, nephrogenic systemic fibrosis, muscle fibrosis, soft tissue (e.g. mediastinum or retroperitoneum) fibrosis, bone marrow fibrosis, joint fibrosis, tendon fibrosis, cartilage fibrosis, pancreas fibrosis, uterus fibrosis, nervous system fibrosis, testis fibrosis, ovary fibrosis, adrenal gland fibrosis, artery fibrosis, vein fibrosis, eye fibrosis, endomyocardial fibrosis, mediastinal fibrosis, myelofibrosis, retroperitoneal fibrosis, progressive massive fibrosis (a complication of coal workers' pneumoconiosis), proliferative fibrosis, neoplastic fibrosis, peri-implantational fibrosis and asbestosis, arthrofibrosis, adhesive capsulitis.

In a most preferred embodiment, the disease is selected in the group consisting of metabolic liver diseases, non-alcoholic fatty liver disease (NAFLD), non-alcoholic steatohepatitis (NASH), drug-induced liver diseases, alcohol-induced liver diseases, infectious agent induced liver diseases, inflammatory liver diseases, immune system dysfunction-mediated liver diseases, dyslipidemia, cardiovascular diseases, restenosis, syndrome X, metabolic syndrome, diabetes, obesity, hypertension, chronic cholangiopathies such as Primary Sclerosing Cholangitis (PSC), Primary Biliary Cholangitis (PBC), biliary atresia, familial intrahepatic cholestasis type 3 (PFIC3), inflammatory bowel diseases, Crohn's disease, ulcerative colitis, liver cancer, hepatocallular carcinoma, gastrointestinal cancer, gastric cancer, colorectal cancer, metabolic disease-induced liver fibrosis or cirrhosis, NAFLD-induced fibrosis or cirrhosis, NASH-induced fibrosis or cirrhosis, alcohol-induced liver fibrosis or cirrhosis, drug-induced liver fibrosis or cirrhosis, infectious agent-induced liver fibrosis or cirrhosis, parasite infection-induced liver fibrosis or cirrhosis, bacterial infection-induced liver fibrosis or cirrhosis, viral infection-induced fibrosis or cirrhosis, HBV-infection induced liver fibrosis or cirrhosis, HCV-infection induced liver fibrosis or cirrhosis, HIV-infection induced liver fibrosis or cirrhosis, dual HCV and HIV-infection induced liver fibrosis or cirrhosis, radiation- or chemotherapy-induced fibrosis or cirrhosis, biliary tract fibrosis, liver fibrosis or cirrhosis due to any chronic cholestatic disease, gut fibrosis of any etiology, Crohn's disease-induced fibrosis, ulcerative colitis-induced fibrosis, intestine (e.g. small intestine) fibrosis, colon fibrosis, stomach fibrosis, lung fibrosis, lung fibrosis consecutive to chronic inflammatory airway diseases, such as COPD, asthma, emphysema, smoker's lung, tuberculosis, pulmonary fibrosis, idiopathic pulmonary fibrosis (IPF), In a further aspect, the pharmaceutical composition of the invention is used in the inhibition of proliferation and/or activation of fibroblasts responsible for the production of collagen fibers and/or responsible for the production of the extracellular matrix.

According to the present invention, the term "autoimmune diseases" is used to designate a condition that arises from an abnormal immune response of the body against substances and tissues normally present in the body. The disease may be restricted to certain organs (e.g in type I diabetes or autoimmune thyroiditis) or involve a particular tissue in different places (e.g. in Goodpasture's disease, affection of the basement membrane in the lung and the kidney).

The term "inflammation" is used to designate a condition that arise from a protective response involving host cells, blood vessels, and proteins and other mediators which may serve to eliminate the cause of cell/tissue injury, as well as the necrotic cells/tissues resulting from the original insult, and to initiate the process of repair. The inflammatory reaction may be manifested by pain, heat, redness, swelling, blood vessels dilatation, blood flow increase and loss of function.

According to the present invention, the terms "fibrosis", "fibrotic disease", "fibrotic disorder" and declinations thereof denote a pathological condition of excessive deposition of fibrous connective tissue in an organ or tissue. More specifically, fibrosis is a pathological process defined by a persistent fibrotic scar formation and overproduction of extracellular matrix by the connective tissue, as a response to tissue damage. Physiologically, the deposit of connective tissue can obliterate the architecture and function of the underlying organ or tissue.

According to the present invention, the fibrosis or fibrotic disorder may be associated with any organ or tissue fibrosis. Illustrative, non-limiting examples of particular organ fibrosis include liver, gut, kidney, skin, epidermis, endodermis, muscle, tendon, cartilage, heart, pancreas, lung, uterus, nervous system, testis, penis, ovary, adrenal gland, artery, vein, colon, intestine (e.g. small intestine), biliary tract, soft tissue (e.g. mediastinum or retroperitoneum), bone marrow, joint or stomach fibrosis, in particular liver, kidney, skin, epidermis, endodermis, muscle, tendon, cartilage, heart, pancreas, lung, uterus, nervous system, testis, ovary, adrenal gland, artery, vein, colon, intestine (e.g. small intestine), biliary tract, soft tissue (e.g. mediastinum or retroperitoneum), bone marrow, joint, eye or stomach fibrosis.

According to the present invention, the terms "cholestasis" or "cholestatic disease", or "cholestatic disorder" and declinations thereof denote a pathological condition defined by a decrease in bile flow due to impaired secretion by hepatocytes or to obstruction of bile flow through intra- or extrahepatic bile ducts. Therefore, the clinical definition of cholestasis is any condition in which substances normally excreted into bile are retained.

In a particular embodiment, the fibrotic disorder is selected in the group consisting of a liver, gut, lung, heart, kidney, muscle, skin, soft tissue (e.g. mediastinum or retroperitoneum), bone marrow, intestinal, and joint (e.g. knee, shoulder or other joints) fibrosis.

In a preferred embodiment, the fibrotic disorder is selected in the group consisting of liver, lung, skin, kidney and intestinal fibrosis.

In a more preferred embodiment of the present invention, treated fibrotic disorder is selected in the group consisting of the following non exhaustive list of fibrotic disorders: non-alcoholic steatohepatitis (NASH), pulmonary fibrosis, idiopathic pulmonary fibrosis, skin fibrosis, eye fibrosis (such as capsular fibrosis), endomyocardial fibrosis, mediastinal fibrosis, myelofibrosis, retroperitoneal fibrosis, progressive massive fibrosis (a complication of coal workers' pneumoconiosis), proliferative fibrosis, neoplastic fibrosis, lung fibrosis consecutive to chronic inflammatory airway disease (COPD, asthma, emphysema, smoker's lung, tuberculosis), alcohol or drug-induced liver fibrosis, liver cirrhosis, infection-induced liver fibrosis, radiation or chemotherapeutic-induced fibrosis, nephrogenic systemic fibrosis, Crohn's disease, ulcerative colitis, keloid, old myocardial infarction, scleroderma/systemic sclerosis, arthrofibrosis, some forms of adhesive capsulitis, chronic fibrosing cholangiopathies such as Primary Sclerosing Cholangitis (PSC) and Primary Biliary Cholangitis (PBC), biliary atresia, familial intrahepatic cholestasis type 3 (PFIC3), peri-implantational fibrosis and asbestosis.

Cholestasis is defined as a decrease in bile flow due to impaired secretion by hepatocytes (hepato-cellular cholestasis) or to obstruction of bile flow through intra- or extra-hepatic bile ducts (obstructive cholestasis). In clinical practice, cholestasis is any condition in which the flow of bile from the liver is slowed or blocked. According to a particular embodiment of the invention, the cholestestatic disease is selected in the group consisting of primary biliary cholangitis (PBC), primary sclerosing cholangitis (PSC), Intrahepatic Cholestasis of Pregnancy, Progressive Familial Intrahepatic Cholestasis, Biliary atresia, Cholelithiasis, Infectious Cholangitis, Cholangitis associated with Langerhans cell histiocytosis, Alagille syndrome, Nonsyndromic ductal paucity, Drug-induced cholestasis, and Total parenteral nutrition-associated cholestasis. In a preferred embodiment, the cholestatic disease is PBC or PSC, in particular PBC.

Examples of inflammatory diseases, fibrotic diseases, metabolic diseases and cholestatic diseases include metabolic liver diseases, non-alcoholic fatty liver disease (NAFLD), non-alcoholic steatohepatitis (NASH), drug-induced liver diseases, alcohol-induced liver diseases, infectious agent induced liver diseases, inflammatory liver diseases, immune system dysfunction-mediated liver diseases, dyslipidemia, cardiovascular diseases, restenosis, syndrome X, metabolic syndrome, diabetes, obesity, hypertension, chronic cholangiopathies such as Primary Sclerosing Cholangitis (PSC), Primary Biliary Cholangitis (PBC), biliary atresia, familial intrahepatic cholestasis type 3 (PFIC3), inflammatory bowel diseases, Crohn's disease, ulcerative colitis, keloid, old myocardial infarction, scleroderma/systemic sclerosis, inflammatory diseases, neurodegenerative diseases, cancers, liver cancer, hepatocallular carcinoma, gastrointestinal cancer, gastric cancer, meningioma associated with neurofibromatosis, pancreatic neuroendocrine tumors, pancreatic exocrine tumors, leukemia, myeloproliferative/myelodisplastic diseases, mastocytosis, dermatofibrosarcoma, solid tumors including breast, lung, thyroid or colorectal cancer, a prostate cancer, liver fibrosis or cirrhosis of any origin, metabolic disease-induced liver fibrosis or cirrhosis, NAFLD-induced fibrosis or cirrhosis, NASH-induced fibrosis or cirrhosis, alcohol-induced liver fibrosis or cirrhosis, drug-induced liver fibrosis or cirrhosis, infectious agent-induced liver fibrosis or cirrhosis, parasite infection-induced liver fibrosis or cirrhosis, bacterial infection-induced liver fibrosis or cirrhosis, viral infection-induced fibrosis or cirrhosis, HBV-infection induced liver fibrosis or cirrhosis, HCV-infection induced liver fibrosis or cirrhosis, HIV-infection induced liver fibrosis or cirrhosis, dual HCV and HIV-infection induced liver fibrosis or cirrhosis, radiation- or chemotherapy-induced fibrosis or cirrhosis, biliary tract fibrosis, liver fibrosis or cirrhosis due to any chronic cholestatic disease, gut fibrosis of any etiology, Crohn's disease-induced fibrosis, ulcerative colitis-induced fibrosis, intestine (e.g. small intestine) fibrosis, colon fibrosis, stomach fibrosis, skin fibrosis, epidermis fibrosis, endodermis fibrosis, skin fibrosis due to scleroderma/systemic sclerosis, lung fibrosis, lung fibrosis consecutive to chronic inflammatory airway diseases, such as COPD, asthma, emphysema, smoker's lung, tuberculosis, pulmonary fibrosis, idiopathic pulmonary fibrosis (IPF), heart fibrosis, kidney fibrosis, nephrogenic systemic fibrosis, muscle fibrosis, soft tissue (e.g. mediastinum or retroperitoneum) fibrosis, bone marrow fibrosis, joint fibrosis, tendon fibrosis, cartilage fibrosis, pancreas fibrosis, uterus fibrosis, nervous system fibrosis, testis fibrosis, ovary fibrosis, adrenal gland fibrosis, artery fibrosis, vein fibrosis, eye fibrosis, endomyocardial fibrosis, mediastinal fibrosis, myelofibrosis, retroperitoneal fibrosis, progressive massive fibrosis (a complication of coal workers' pneumoconiosis), proliferative fibrosis, neoplastic fibrosis, peri-implantational fibrosis and asbestosis, arthrofibrosis, adhesive capsulitis.

Preferably, the disease is selected in the group consisting of metabolic liver diseases, non-alcoholic fatty liver disease (NAFLD), non-alcoholic steatohepatitis (NASH), drug-induced liver diseases, alcohol-induced liver diseases, infectious agent induced liver diseases, inflammatory liver diseases, immune system dysfunction-mediated liver diseases, dyslipidemia, cardiovascular diseases, restenosis, syndrome X, metabolic syndrome, diabetes, obesity, hypertension, chronic cholangiopathies such as Primary Sclerosing Cholangitis (PSC), Primary Biliary Cholangitis (PBC), biliary atresia, familial intrahepatic cholestasis type 3 (PFIC3), inflammatory bowel diseases, Crohn's disease, ulcerative colitis, liver cancer, hepatocallular carcinoma, gastrointestinal cancer, gastric cancer, colorectal cancer, metabolic disease-induced liver fibrosis or cirrhosis, NAFLD-induced fibrosis or cirrhosis, NASH-induced fibrosis or cirrhosis, alcohol-induced liver fibrosis or cirrhosis, drug-induced liver fibrosis or cirrhosis, infectious agent-induced liver fibrosis or cirrhosis, parasite infection-induced liver fibrosis or cirrhosis, bacterial infection-induced liver fibrosis or cirrhosis, viral infection-induced fibrosis or cirrhosis, HBV-infection induced liver fibrosis or cirrhosis, HCV-infection induced liver fibrosis or cirrhosis, HIV-infection induced liver fibrosis or cirrhosis, dual HCV and HIV-infection induced liver fibrosis or cirrhosis, radiation- or chemotherapy-induced fibrosis or cirrhosis, biliary tract fibrosis, liver fibrosis or cirrhosis due to any chronic cholestatic disease, gut fibrosis of any etiology, Crohn's disease-induced fibrosis, ulcerative colitis-induced fibrosis, intestine (e.g. small intestine) fibrosis, colon fibrosis, stomach fibrosis, lung fibrosis, lung fibrosis consecutive to chronic inflammatory airway diseases, such as COPD, asthma, emphysema, smoker's lung, tuberculosis, pulmonary fibrosis, idiopathic pulmonary fibrosis (IPF), The term "treatment" or "treating" refers to the curative or preventive treatment of a disorder in a subject in need thereof. The treatment involves the administration of the compound, in particular comprised in a pharmaceutical composition, to a subject having a declared disorder, i.e. to a patient, to cure, delay, reverse, or slow down the progression of the disorder, improving thereby the condition of the subject. The treatment may also result in an alleviation of symptoms associated with a disorder, or halt of further progression or worsening of those symptoms. A treatment may also be administered to a subject that is healthy or at risk of developing a cholestatic or fibrotic disorder to prevent or delay the disorder.

Therefore, according to the invention, the treatment of an immune, inflammatory, metabolic, fibrotic and cholestatic disease involves the administration of a therapeutically effective amount of elafibranor, to a subject having a declared disorder to cure, delay, reverse or slow down the progression of the disorder, thus improving the condition of the patient, or to a healthy subject, in particular a subject who is at risk of developing such disease.

The invention is further described by reference to the following examples which set forth in detail the preparation of crystalline forms of the present invention.

EXAMPLES

X-Ray Powder Diffraction (XRPD) Analysis

X-ray powder diffraction (XRPD) analyses were conducted on a Bruker AXS D8 Advance system, in a θ-θ configuration, using a copper anti-cathode, a mono-crystalline silicon sample holder and a Lynxeye detector. Instrument operating conditions for X-ray pattern acquisition are described in TABLE 1.

| | | |
|---|---|---|
| | Temperature | Ambient |
| | Atmosphere | Ambient |
| X-rays generator | voltage (kV) | 40 |
| | intensity (mA) | 40 |
| X-rays source | target | Cu |
| | radiation | Kα |
| | λ (nm) | 0.154184 |
| | Kβ filter radiation | Nickel |
| Slit | anti-divergence (mm) | 0.6 |
| Goniometer | angular sector analyzed (° for 2θ) | 5-40 |
| | step size (° for 2θ) | 0.069 |
| Rotation speed for sample holder (rpm) | | 30 |
| Detection | Angular opening (°) | 8 |
| | step time for measuring diffracted intensity (s) | 6 |
| Analyzed mass (mg) | | # 2-5 |

After maturation, the powder sample is dispersed on the silicon sample holder in a way to avoid preferred orientation (not randomly oriented crystals) and to ensure planarity of the specimen surface.

X-ray diffraction of Forms A, B, C, D and E are shown in FIGS. 1, 2, 3, 4 and 5 respectively.

Thermogravimetric Analyses (TGA) and Infra-Red (IR)

Thermogravimetric analyses (TGA) coupled to Infra-Red (IR) were conducted on a TA Instruments ATG 2950 with EGA oven, and a ThermoNicolet Nexus FT-IR with coupling cells and gaz transfer line for TGA gas analyses.

The samples, put on an aluminum capsule in the thermogravimetric analyzer, were heated from room temperature to 300° C. A ramp rate of 10° C./minute was used. During heating, the oven of the thermagravimetric analyzer was continuously on nitrogen purge low at a 90 mL/min flow (Air Liquide gas, Alphagaz N2 quality).

The gas produced by the TGA oven were transferred to the FT-IR instrument using the gas transfer line. Analysing cell and the gas transfer line were maintained at 110° C. On the IR bench, the spectral resolution was at 4 cm−1, the scanning rate was 0.62329 cm/sec, and a IR spectrum was recorded every 32 seconds.

HPLC Analyses

HPLC analyses were performed on a Water column Waters, Symmetry Shiel RP18, 4.5×150 mm. Table 3 displays the HPLC parameters used to analyze samples.

| | | | |
|---|---|---|---|
| HPLC system | Injector/Pump: Alliance 2695 Waters<br>Detector: Photo Diode Array 996 Waters | | |
| Column | Waters, Symmetry Shield, RP18<br>150 mm × 4.5 mm − dp = 5 μm | | |
| Mobile phase | A: H2O/TFA 0.05%<br>B: MeOH/TFA 0.01% | | |
| | Time (min) | A % | B % |
| | 0 | 40 | 60 |
| | 2 | 40 | 60 |
| | 35 | 5 | 95 |
| | 35.1 | 40 | 60 |
| | 40 | 40 | 60 |
| Flow rate | 1 mL/min | | |
| Column Temperature | Room temperature | | |
| Detection | UV: λ = 350 nm | | |
| Test solution | Suitable dilution in MeOH<br>2 independent assays were performed | | |
| Injection volume | 20 μL | | |
| Injector Temperature | Room temperature | | |
| Retention time | ≈16.7 min for GFT505 | | |

Preparation of the Samples:

About 1 mg of the solid recrystallization residue was put in a 10 mL volumetric flask then dissolved to 10 ML with MeOH. Immediately after dissolution of the sample in MeOH, the solutions are processed, packaged and stored away from the light, Results:

All the samples recrystallized (forms A to E) correspond to elafibranor, with a similar retention time and a purity percent of at least 98.9% which prove that the samples correspond to elafibranor and are not degradation product.

Synthesis of Raw Elafibranor

Tert-butyl ester of elafibranor ("the compound" in the following experimental part) was realized according to the method described in WO2011144579. The ester (1 eq) was stirred at room temperature in dichloromethane and trifluoroacetic acid (10 eq) was added. The reaction mixture is hydrolyzed then washed with water. Dichloromethane was evaporated then the resulting solid was filtered to afford crude elafibranor.

Crystallization Methods

Different methods were identified to produce specific crystalline forms of elafibranor.

Form A

Form A can be obtained by crystallization of elafibranor prepared as hereabove in standing according to the method described by Z. Szokol (2018) (IP.com number IPCOM000252802D). This method affords elafibranor with 77.2% yield.

TABLE 4 lists the numerical values of the XRPD peak position of FIG. 1 diffractogram.

TABLE 4

| Angle | Inter-reticular | Intensity | |
|---|---|---|---|
| 2-θ (°) | distance (Å) | c.p.s. | % |
| 8.3 | 10.7 | 3338 | 18.2 |
| 10.7 | 8.3 | 8804 | 48.0 |

TABLE 4-continued

| Angle | Inter-reticular | Intensity | |
|---|---|---|---|
| 2-θ (°) | distance (Å) | c.p.s. | % |
| 11.6 | 7.6 | 5882 | 32.1 |
| 12.6 | 7.0 | 3449 | 18.8 |
| 13.6 | 6.5 | 672 | 3.7 |
| 15.1 | 5.9 | 18324 | 100.0 |
| 16.6 | 5.3 | 2478 | 13.5 |
| 17.2 | 5.2 | 13353 | 72.9 |
| 19.0 | 4.7 | 5075 | 27.7 |
| 19.7 | 4.5 | 536 | 2.9 |
| 20.7 | 4.3 | 4311 | 23.5 |
| 21.4 | 4.1 | 1028 | 5.6 |
| 22.0 | 4.0 | 896 | 4.9 |
| 23.3 | 3.8 | 692 | 3.8 |
| 23.8 | 3.7 | 5645 | 30.8 |
| 24.4 | 3.6 | 585 | 3.2 |
| 24.8 | 3.6 | 527 | 2.9 |
| 25.4 | 3.5 | 3444 | 18.8 |
| 25.7 | 3.5 | 592 | 3.2 |
| 26.2 | 3.4 | 2026 | 11.1 |
| 26.9 | 3.3 | 5407 | 29.5 |
| 27.6 | 3.2 | 1473 | 8.0 |
| 28.3 | 3.2 | 812 | 4.4 |
| 28.8 | 3.1 | 466 | 2.5 |
| 29.0 | 3.1 | 1666 | 9.1 |
| 29.7 | 3.0 | 575 | 3.1 |

Form B

Form B of elafibranor was prepared according to the following method:

The wet crude elafibranor prepared as hereabove was charged with isopropyl alcohol in an appropriate reactor and the mixture is heated to 70° C. and stirred until dissolution is reached. After partial distillation of isopropyl alcohol (about half of the initial volume of solution)), the reaction mixture was cooled at 0° C. and crystallized to afford purified elafibranor after filtration, washing with cold isopropyl alcohol and drying. Yield 76%.

TABLE 5 lists the numerical values of the XRPD peak position of FIG. 2 diffractogram.

TABLE 5

| Angle | Inter-reticular | Intensity | |
|---|---|---|---|
| 2-θ (°) | distance (Å) | c.p.s. | % |
| 7.9 | 11.2 | 3481 | 43.7 |
| 11.0 | 8.0 | 4873 | 61.1 |
| 11.1 | 7.9 | 4839 | 60.7 |
| 12.3 | 7.2 | 5605 | 70.3 |
| 12.6 | 7.0 | 2246 | 28.2 |
| 13.5 | 6.6 | 72.90 | 91.4 |
| 14.1 | 6.3 | 880 | 11.0 |
| 15.3 | 5.8 | 887 | 11.1 |
| 15.7 | 5.6 | 2496 | 31.3 |
| 15.9 | 5.6 | 3216 | 40.3 |
| 16.3 | 5.4 | 4250 | 53.3 |
| 16.6 | 5.3 | 2676 | 33.6 |
| 17.2 | 5.1 | 7972 | 100.0 |
| 17.4 | 5.1 | 6925 | 86.9 |
| 19.0 | 4.7 | 1241 | 15.6 |
| 20.0 | 4.4 | 1737 | 21.8 |
| 20.3 | 4.4 | 1224 | 15.4 |
| 21.4 | 4.1 | 746 | 9.4 |
| 22.1 | 4.0 | 542 | 6.8 |
| 22.8 | 3.9 | 2414 | 30.3 |
| 23.1 | 3.8 | 898 | 12.4 |
| 23.5 | 3.8 | 2541 | 31.9 |
| 23.8 | 3.7 | 1364 | 17.1 |
| 24.4 | 3.6 | 1450 | 18.2 |
| 25.2 | 3.5 | 1420 | 17.8 |
| 25.4 | 3.5 | 1035 | 13.0 |

TABLE 5-continued

| Angle | Inter-reticular | Intensity | |
|---|---|---|---|
| 2-θ (°) | distance (Å) | c.p.s. | % |
| 25.9 | 3.4 | 671 | 8.4 |
| 26.3 | 3.4 | 2011 | 25.2 |
| 26.7 | 3.3 | 1342 | 16.8 |
| 27.2 | 3.3 | 1093 | 13.7 |
| 27.8 | 3.2 | 1491 | 18.7 |
| 28.3 | 3.1 | 2250 | 28.2 |
| 29.3 | 3.0 | 481 | 6.0 |
| 29.6 | 3.0 | 631 | 7.9 |

Form C

Elafibranor (10.6 mg) prepared as hereabove were suspended, at room temperature, in ethanol (240 μL) which was previously saturated in elafibranor (28.7 mg/mL).

For the step of crystallization, the suspension was stayed at a temperature between +4° C. to +8° C. to limit chemical degradation before characterization of the insoluble compound by XRPD, then characterization by optical microscopy and differential scanning calorimeter.

Analysis showed that Form C is an ethanol solvate with 1:1 stoechiometry.

HPLC confirms that Form C is elafibranor (not a degradation product) (same retention time–99% purity).

TABLE 6 lists the numerical values of the XRPD peak position of FIG. 3 diffractogram.

TABLE 6

| Angle | Inter-reticular | Intensity | |
|---|---|---|---|
| 2-θ (°) | distance (Å) | c.p.s. | % |
| 8.9 | 10.0 | 499 | 18.7 |
| 10.1 | 8.8 | 759 | 28.4 |
| 10.7 | 8.3 | 423 | 15.8 |
| 11.3 | 7.9 | 377 | 14.1 |
| 14.7 | 6.0 | 293 | 11.0 |
| 15.5 | 5.7 | 344 | 12.9 |
| 15.8 | 5.6 | 319 | 12.0 |
| 16.5 | 5.4 | 166 | 6.2 |
| 16.9 | 5.2 | 149 | 5.6 |
| 17.7 | 5.0 | 2671 | 100.0 |
| 19.6 | 4.5 | 690 | 25.8 |
| 20.3 | 4.4 | 405 | 15.2 |
| 20.9 | 4.2 | 237 | 8.9 |
| 23.3 | 3.8 | 2044 | 76.5 |
| 23.9 | 3.7 | 171 | 6.4 |
| 25.0 | 3.6 | 135 | 5.0 |
| 25.3 | 3.5 | 124 | 4.6 |
| 27.3 | 3.3 | 2454 | 91.9 |
| 28.0 | 3.2 | 159 | 6.0 |
| 28.9 | 3.1 | 1001 | 37.5 |
| 30.6 | 2.9 | 215 | 8.1 |
| 31.6 | 2.8 | 202 | 7.6 |
| 32.0 | 2.8 | 570 | 21.3 |
| 32.8 | 2.7 | 132 | 4.9 |
| 33.5 | 2.7 | 182 | 6.8 |
| 34.3 | 2.6 | 1396 | 52.3 |
| 34.6 | 2.6 | 1765 | 66.1 |
| 35.5 | 2.5 | 514 | 19.3 |
| 36.3 | 2.5 | 195 | 7.3 |
| 37.3 | 2.4 | 259 | 9.7 |

Form D

Elafibranor (13.4 mg) prepared as hereabove were suspended, at room temperature, in methanol (200 μL) which was previously saturated in elafibranor (17.7 mg/mL).

For the step of crystallization, the suspension was stayed at a temperature between +4° C. to +8° C. to limit chemical degradation before characterization of the insoluble compound by XRPD, then characterization by optical microscopy and differential scanning calorimeter.

Analysis allowed to conclude that form D is a methanol solvate with 1/1 stoechiometry.

HPLC confirms that Form D is elafibranor (not a degradation product) (same retention time–99% purity).

TABLE 7 lists the numerical values of the XRPD peak position of FIG. 4 diffractogram.

TABLE 7

| Angle 2-θ (°) | Inter-reticular distance (Å) | Intensity c.p.s. | Intensity % |
|---|---|---|---|
| 7.8 | 11.4 | 1064 | 46.7 |
| 9.3 | 9.5 | 427 | 18.8 |
| 10.9 | 8.1 | 1175 | 51.6 |
| 12.9 | 6.9 | 423 | 18.5 |
| 13.4 | 6.6 | 631 | 27.7 |
| 14.7 | 6.0 | 532 | 23.3 |
| 15.6 | 5.7 | 2278 | 100.0 |
| 16.1 | 5.5 | 2061 | 90.5 |
| 17.7 | 5.0 | 1081 | 47.4 |
| 18.1 | 4.9 | 694 | 30.5 |
| 18.6 | 4.8 | 1907 | 83.7 |
| 19.3 | 4.6 | 253 | 11.1 |
| 19.9 | 4.5 | 1228 | 53.9 |
| 20.7 | 4.3 | 2025 | 88.9 |
| 21.9 | 4.1 | 1045 | 45.9 |
| 22.3 | 4.0 | 716 | 31.4 |
| 23.5 | 3.8 | 276 | 12.1 |
| 24.1 | 3.7 | 671 | 29.4 |
| 24.6 | 3.6 | 956 | 42.0 |
| 25.1 | 3.5 | 326 | 14.3 |
| 25.5 | 3.5 | 485 | 21.3 |
| 25.8 | 3.4 | 572 | 25.1 |
| 26.1 | 3.4 | 441 | 19.4 |
| 26.9 | 3.3 | 274 | 12.0 |
| 27.3 | 3.3 | 415 | 18.2 |
| 28.0 | 3.2 | 387 | 17.0 |
| 28.4 | 3.1 | 613 | 26.9 |
| 29.2 | 3.1 | 463 | 20.3 |
| 29.9 | 3.0 | 346 | 15.2 |
| 30.3 | 2.9 | 194 | 8.5 |
| 31.0 | 2.9 | 176 | 7.7 |
| 31.5 | 2.8 | 187 | 8.2 |
| 32.1 | 2.8 | 184 | 8.1 |
| 32.3 | 2.8 | 322 | 14.1 |
| 32.9 | 2.7 | 342 | 15.0 |
| 33.3 | 2.7 | 264 | 11.6 |
| 33.6 | 2.7 | 331 | 14.5 |
| 34.1 | 2.6 | 237 | 10.4 |
| 34.8 | 2.6 | 244 | 10.7 |
| 36.5 | 2.5 | 141 | 6.2 |
| 37.1 | 2.4 | 128 | 5.6 |
| 37.9 | 2.4 | 266 | 11.7 |
| 38.8 | 2.3 | 166 | 7.3 |
| 39.1 | 2.3 | 175 | 7.7 |
| 39.5 | 2.3 | 159 | 7.0 |
| 40.3 | 2.2 | 185 | 8.1 |

Form E

Elafibranor (10.7 mg) prepared as hereabove were suspended, at room temperature, in N,N-dimethylacetamide (DMA) (100 μL) which was previously saturated in elafibranor (11.9 mg/mL).

For the step of crystallization, the suspension was stayed for a 4 weeks period away from the light at room temperature before characterization of the insoluble compound by XRPD, then characterization by optical microscopy and differential scanning calorimeter.

Analysis showed that Form E is a N,N-dimethylacetamide solvate with 1/1 stoechiometry.

HPLC confirms that Form E is elafibranor (not a degradation product) (same retention time–99% purity)

TABLE 8 lists the numerical values of the XRPD peak position of FIG. 5 diffractogram.

TABLE 8

| Angle 2-θ (°) | Inter-reticular distance (Å) | Intensity c.p.s. | Intensity % |
|---|---|---|---|
| 7.6 | 11.6 | 879 | 15.4 |
| 8.6 | 10.3 | 1001 | 17.5 |
| 11.2 | 7.9 | 1018 | 17.9 |
| 13.3 | 6.7 | 5018 | 88.0 |
| 14.7 | 6.0 | 727 | 12.7 |
| 15.1 | 5.9 | 5655 | 99.2 |
| 16.1 | 5.5 | 827 | 14.5 |
| 16.9 | 5.2 | 842 | 14.8 |
| 17.1 | 5.2 | 2876 | 50.4 |
| 17.8 | Na | 898 | 15.8 |
| 18.1 | 4.9 | 1981 | 34.7 |
| 19.0 | 4.7 | 407 | 7.1 |
| 19.9 | 4.5 | 390 | 6.8 |
| 20.6 | 4.3 | 293 | 5.1 |
| 21.2 | 4.2 | 432 | 7.6 |
| 22.1 | 4.0 | 479 | 8.4 |
| 22.8 | 3.9 | 1047 | 18.4 |
| 23.2 | 3.8 | 508 | 8.9 |
| 24.4 | 3.6 | 366 | 6.4 |
| 24.8 | 3.6 | 450 | 7.9 |
| 25.2 | 3.5 | 1212 | 21.2 |
| 25.9 | 3.4 | 1222 | 21.4 |
| 26.2 | 3.4 | 1409 | 24.7 |
| 26.7 | 3.3 | 616 | 10.8 |
| 27.1 | 3.3 | 513 | 9.0 |
| 27.8 | 3.2 | 343 | 6.0 |
| 28.1 | 3.2 | 464 | 8.1 |
| 29.5 | 3.0 | 5703 | 100.0 |
| 30.6 | 2.9 | 326 | 5.7 |
| 31.3 | 2.9 | 245 | 4.3 |
| 31.8 | 2.8 | 280 | 4.9 |
| 32.1 | 2.8 | 453 | 7.9 |
| 33.2 | 2.7 | 515 | 9.0 |
| 34.0 | 2.6 | 255 | 4.5 |
| 34.9 | 2.6 | 331 | 5.8 |
| 36.3 | 2.5 | 214 | 3.7 |
| 37.9 | 2.4 | 296 | 5.2 |
| 38.1 | 2.4 | 350 | 6.1 |
| 39.3 | 2.3 | 388 | 6.8 |

The invention claimed is:

1. A crystal form of elafibranor having a X-ray diffraction pattern comprising the following diffraction peaks (2θ in angular degrees ±0.2°): 17.7°, 23.3°, 27.3°, 34.3°, and 34.6°.

2. The crystal form of elafibranor according to claim 1, wherein the X-ray diffraction pattern further comprises a diffraction peak (2θ in angular degrees ±0.2°) at 28.9°.

3. The crystal form of elafibranor according to claim 1, wherein the X-ray diffraction pattern comprises at least one more peak (2θ in angular degrees ±0.2°) selected from the group consisting of: 8.9°, 10.1°, 10.7°, 11.3°, 32.0° and 35.5°.

4. The crystal form of elafibranor according to: claim 1, wherein the X-ray diffraction pattern comprises the following diffraction peaks (2θ in angular degrees ±0.2°): 8.9°, 10.1°, 10.7°, 11.3°, 17.7°, 23.3°, 27.3°, 28.9°, 32.0°, 34.3°, 34.6° and 35.5°.

5. A crystal form of elafibranor having a X-ray diffraction pattern comprising the following diffraction peaks (2θ in angular degrees ±0.2°): 10.9°, 15.6°, 16.1°, 18.6°, 19.9° and 20.7°.

6. The crystal form of elafibranor according to claim 5, wherein the X-ray diffraction pattern further comprises at least one further diffraction peak (2θ in angular degrees ±0.2°) selected in the group consisting of 7.8°, 17.7°, 18.1°, 21.9°, 22.3° and 24.6°.

7. The crystal form of elafibranor according to claim 6, wherein the X-ray diffraction pattern further comprises at least one further diffraction peak (2θ in angular degrees ±0.2°) selected from the group consisting of 9.3°, 12.9°, 13.4°, 14.7°, 24.1°, 25.1°, 25.5°, 25.8°, 26.1°, 27.3°, 28.0°, 28.4°, 29.2°, 29.9°, 32.3°, 32.9° and 33.6°.

8. The crystal form of elafibranor according to claim 5, wherein the X-ray diffraction pattern comprises the following diffraction peaks (2θ in angular degrees ±0.2°): 7.8°, 9.3°, 10.9°, 12.9°, 13.4°, 14.7°, 15.6°, 16.1°, 17.7°, 18.1°, 18.6°, 19.9°, 20.7°, 21.9°, 22.3°, 24.1°, 24.6°, 25.1°, 25.5°, 25.8°, 26.1°, 27.3°, 28.0°, 28.4°, 29.2°, 29.9°, 32.3°, 32.9° and 33.6°.

9. A crystal form of elafibranor having a X-ray diffraction pattern comprising the following diffraction peaks (2θ in angular degrees ±0.2°): 13.3°, 15.1°, 17.1° and 29.5°.

10. The crystal form of elafibranor according to claim 9, wherein the X-ray diffraction pattern further comprises at least one further diffraction peak (2θ in angular degrees ±0.2°) selected from the group consisting of 18.1°, 25.2°, 25.9° and 26.2°.

11. The crystal form of elafibranor according to claim 10, wherein the X-ray diffraction pattern further comprises at least one further diffraction peak (2θ in angular degrees ±0.2°) selected from the group consisting of 7.6°, 8.6°, 11.2°, 16.1°, 16.9°, 17.8° and 22.8°.

12. The crystal form of elafibranor according to claim 9, wherein the X-ray diffraction pattern comprises the following diffraction peaks (2θ in angular degrees ±0.2°): 7.6°, 8.6°, 11.2°, 13.3°, 15.1°, 17.1°, 16.1°, 16.9°, 17.8°, 18.1°, 22.8°, 25.2°, 25.9°, 26.2° and 29.5°.

13. A pharmaceutical composition comprising the crystal form of elafibranor according to claim 1, and at least one pharmaceutically acceptable excipient.

14. The pharmaceutical composition according to claim 13, wherein said composition is formulated in the form of a tablet, injectable suspension, gel, oil, pill, suppository, powder, gel cap, capsule, aerosol or a prolonged release galenic form or a slow release galenic form.

15. A method of treating a liver disorder, comprising administering to a subject in need thereof an effective amount of the crystal form of elafibranor according to claim 1, wherein the liver disorder is selected from the group consisting of non-alcoholic fatty liver disease (NAFLD), and non-alcoholic steatohepatitis (NASH), liver cirrhosis.

16. A method of treating a cholestatic disease, comprising administering to a subject in need thereof an effective amount of the crystal form of elafibranor according to claim 1, wherein the cholestatic disease is primary biliary cholangitis (PBC) or primary sclerosing cholangitis (PSC).

17. A method of treating a liver disorder, comprising administering to a subject in need thereof an effective amount of the pharmaceutical composition according to claim 13, wherein the liver disorder is selected from the group consisting of non-alcoholic fatty liver disease (NAFLD), non-alcoholic steatohepatitis (NASH), and liver cirrhosis.

18. A method of treating a cholestatic disease, comprising administering to a subject in need thereof an effective amount of the pharmaceutical composition according to claim 13, wherein the cholestatic disease is primary biliary cholangitis (PBC) or primary sclerosing cholangitis (PSC).

19. A method of treating a liver disorder or a cholestatic disease, comprising administering to a subject in need thereof an effective amount of the crystal form of elafibranor according to claim 5, wherein the liver disorder is selected from the group consisting of non-alcoholic fatty liver disease (NAFLD), non-alcoholic steatohepatitis (NASH), and liver cirrhosis, and wherein the cholestatic disease is primary biliary cholangitis (PBC) or primary sclerosing cholangitis (PSC).

20. A method of treating a liver disorder or a cholestatic disease, comprising administering to a subject in need thereof an effective amount of the crystal form of elafibranor according to claim 9, wherein the liver disorder is selected from the group consisting of non-alcoholic fatty liver disease (NAFLD), non-alcoholic steatohepatitis (NASH), and liver cirrhosis, and wherein the cholestatic disease is primary biliary cholangitis (PBC) or primary sclerosing cholangitis (PSC).

21. A pharmaceutical composition comprising a crystal form of elafibranor according to claim 5, and at least one pharmaceutically acceptable excipient.

22. A pharmaceutical composition comprising the crystal form of elafibranor according to claim 9, and at least one pharmaceutically acceptable excipient.

* * * * *